United States Patent [19]

Walter

[11] Patent Number: 5,013,826

[45] Date of Patent: May 7, 1991

[54] AZO DYES CONTAINING 5-CYCLOHEXYLCARBONYL-THIOPHENE DIAZO COMPONENTS AND 1,2,3,4-TETRAHYDROQUINOLINE COUPLING COMPONENTS

[75] Inventor: Harald Walter, Basel, Switzerland

[73] Assignee: Ciba-Geigy Corporation, Ardsley, N.Y.

[21] Appl. No.: 312,789

[22] Filed: Feb. 21, 1989

[30] Foreign Application Priority Data

Feb. 26, 1988 [CH] Switzerland ............................ 729/88
Apr. 18, 1988 [CH] Switzerland .......................... 1414/88

[51] Int. Cl.$^5$ .................... C09B 29/033; C09B 29/44; D06P 3/24
[52] U.S. Cl. .................................. 534/768; 534/583; 534/591; 534/593; 534/728; 534/887; 534/641; 534/643; 544/105; 546/172; 549/68
[58] Field of Search ........................................ 534/768

[56] References Cited

U.S. PATENT DOCUMENTS

| | | | |
|---|---|---|---|
| 4,255,326 | 3/1981 | Giles et al. ............................ | 534/768 |
| 4,264,495 | 4/1981 | Maher et al. .......................... | 534/768 |
| 4,282,144 | 8/1981 | Weaver et al. ....................... | 534/768 |
| 4,282,229 | 8/1981 | Sarsas et al. ......................... | 424/258 |
| 4,301,069 | 11/1981 | Weaver et al. ....................... | 534/768 |
| 4,400,318 | 8/1983 | Weaver et al. ....................... | 534/768 |
| 4,459,229 | 7/1984 | Weaver et al. ....................... | 534/768 |

FOREIGN PATENT DOCUMENTS

| | | | |
|---|---|---|---|
| 017558 | 10/1980 | European Pat. Off. ............ | 534/768 |
| 2324512 | 11/1973 | Fed. Rep. of Germany ...... | 534/768 |
| 2148917 | 6/1985 | United Kingdom ................ | 534/768 |

OTHER PUBLICATIONS

*Research Disclosure*, No. 191, p. 128, (1980).

Primary Examiner—Floyd D. Higel
Assistant Examiner—Fiona T. Powers
Attorney, Agent, or Firm—George R. Dohmann; Edward McC. Roberts

[57] ABSTRACT

The azo dyes of the formula

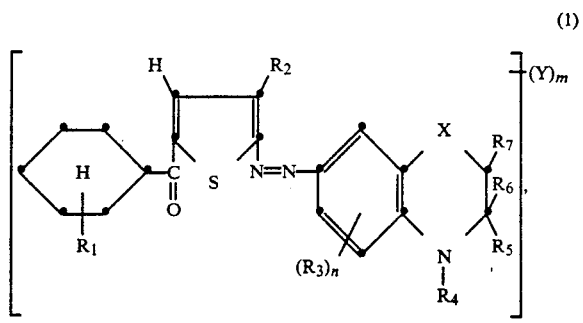

(1)

in which $R_1$ is hydrogen or substituted or unsubstituted $C_1$–$C_{10}$alkyl, $R_2$ is a group of the formula, —CN, —CON($R_8$)$R_9$, —COR$_{10}$, —COOR$_{11}$, —SO$_2$R$_{12}$ or —CONHNHR$_{13}$, $R_3$ is hydrogen, halogen, $C_1$–$C_4$alkyl, $C_2$–$C_6$alkanoylamino, $C_1$–$C_{10}$alkoxy or phenoxy, $R_4$ is substituted or unsubstituted $C_1$–$C_{10}$alkyl, $R_5$ is $C_1$–$C_4$alkyl, $R_6$ is hydrogen or $C_1$–$C_4$alkyl, $R_7$ is hydrogen or $C_1$–$C_4$alkyl, $R_8$, $R_9$ and $R_{13}$, independently of one another, are hydrogen or substituted or unsubstituted $C_1$–$C_{10}$alkyl, $C_5$–$C_7$cycloalkyl, phenyl or naphthyl, $R_{10}$, $R_{11}$ and $R_{12}$ are substituted or unsubstituted $C_1$–$C_{10}$alkyl, $C_5$–$C_7$cycloalkyl, phenyl or naphthyl, X is an oxygen atom or a group of the formula —CH($R_{14}$)— in which $R_{14}$ is hydrogen or $C_1$–$C_4$alkyl, Y is a water-solubilizing group, n is the number 1 or 2 and m is the number 1 or 2, produce on nitrogen-containing or hydroxyl-containing fibre materials dyeings having good fastness properties.

2 Claims, No Drawings

AZO DYES CONTAINING 5-CYCLOHEXYLCARBONYL-THIOPHENE DIAZO COMPONENTS AND 1,2,3,4-TETRAHYDROQUINOLINE COUPLING COMPONENTS

The present invention relates to novel azo dyes, processes for their preparation and the use of these dyes for dyeing and printing fibre materials, in particular textile fibre materials.

The present invention relates to azo dyes of the formula

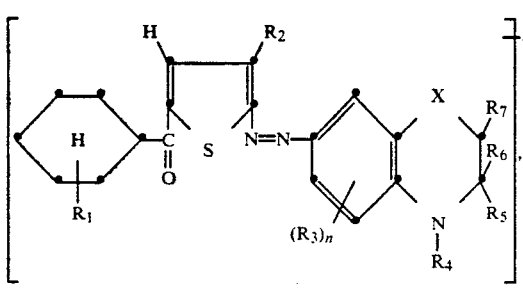

in which $R_1$ is hydrogen or substituted or unsubstituted $C_1$-$C_{10}$alkyl, $R_2$ is a group of the formula —CN, —CON($R_8$)$R_9$, —COR$_{10}$, —COOR$_{11}$, —SO$_2$R$_{12}$ or —CONHNHR$_{13}$, $R_3$ is hydrogen, halogen, $C_1$-$C_4$alkyl, $C_2$-$C_6$alkanoylamino, $C_1$-$C_{10}$alkoxy or phenoxy, $R_4$ is substituted or unsubstituted $C_1$-$C_{10}$alkyl, $R_5$ is $C_1$-$C_4$alkyl, $R_6$ is hydrogen or $C_1$-$C_4$alkyl, $R_7$ is hydrogen or $C_1$-$C_4$alkyl, $R_8$, $R_9$ and $R_{13}$, independently of one another, are hydrogen or substituted or unsubstituted $C_1$-$C_{10}$ alkyl, $C_5$-$C_7$cycloalkyl, phenyl or naphthyl, $R_{10}$, $R_{11}$ and $R_{12}$ are substituted or unsubstituted $C_1$-$C_{10}$alkyl, $C_5$-$C_7$cycloalkyl, phenyl or naphthyl, X is an oxygen atom or a group of the formula —CH($R_{14}$)— in which $R_{14}$ is hydrogen or $C_1$-$C_4$alkyl, Y is a water-solubilizing group, n is the number 1 or 2 and m is the number 1 or 2.

Examples of $R_1$, $R_4$, $R_8$, $R_9$, $R_{10}$, $R_{11}$ $R_{12}$, and $R_{13}$ in formula (1) as the $C_1$-$C_{10}$alkyl are: methyl, ethyl, propyl, isopropyl, butyl, isobutyl, sec.butyl, tert.butyl, pentyl, hexyl, octyl or decyl, and also the corresponding radicals which are substituted, for example by hydroxyl, alkoxy having 1 to 4 carbon atoms, phenyl, sulfo, sulfato, thiosulfato, cyano or halogen, for example β-hydroxyethyl, β-methoxyethyl, β-chlorocyano ethyl, benzyl, β-sulfatoethyl, γ-methoxypropyl and β-ethoxyethyl.

Examples of $R_3$, $R_5$, $R_6$, $R_7$ and $R_{14}$ in formula (1) as $C_1$-$C_4$alkyl are: methyl, ethyl, propyl, isopropyl, butyl, sec.butyl, isobutyl and tert.butyl.

Examples of $R_8$, $R_9$, $R_6$hd 10, $R_{11}$, $R_{12}$ and $R_{13}$ in formula (1) as $C_5$-$C_7$cycloalkyl are: cyclopentyl, cyclohexyl and cycloheptyl, and also the corresponding radicals which are substituted, for example by halogen, such as fluorine, chlorine or bromine, $C_1$-$C_4$alkyl, such as methyl, ethyl, propyl, isopropyl, butyl, isobutyl, sec.butyl and tert.butyl, $C_1$-$C_4$alkoxy, such as methoxy, ethoxy, propoxy, isopropoxy, butoxy, isobutoxy, sec.butoxy and tert.butoxy. An example is the methylcyclohexyl radical.

Examples of $R_8$, $R_9$, $R_{10}$, $R_{11}$, $R_{12}$ and $R_{13}$ in formula (1) as substituted or unsubstituted phenyl or naphthyl are, apart from unsubstituted phenyl or naphthyl, those radicals having, for example, the following substituents: $C_1$-$C_4$alkyl, such as methyl, ethyl, propyl, isopropyl, butyl, isobutyl, sec.butyl and tert.butyl, $C_1C_4$alkoxy, such as methoxy, ethoxy, propoxy, isopropoxy, butoxy, isobutoxy. sec.butoxy and tert.butoxy, halogen, such as fluorine, chlorine and bromine, $C_2$-$C_4$alkanoylamino, such as acetylamino and propionylamino, benzoylamino or sulfo.

Examples of $R_3$ in formula (1) as $C_2$-$C_6$alkanoylamino are acetylamino, propionylamino and butyrylamino.

Examples of $R_3$ in formula (1) as $C_1$-$C_{10}$alkoxy are: methoxy, ethoxy, propoxy, isopropoxy, butoxy, sec.butoxy. isobutoxy, tert.butoxy, pentyloxy, hexyloxy, octyloxy or decyloxy and also the corresponding radicals which are substituted, for example by hydroxyl, $C_1$-$C_4$alkoxy, phenyl or halogen, for example β-ethoxyethoxy.

Examples of $R_3$ in formula (1) as halogen are: fluorine, bromine or in particular chlorine.

Examples of $R_3$ in formula (1) as phenoxy are unsubstituted phenoxy or phenoxy radical substituted by $C_1$-$C_4$alkyl, such as methyl, ethyl, propyl, isopropyl, butyl, isobutyl, sec.butyl and tert.butyl, $C_1$-$C_4$alkoxy, such as methoxy, ethoxy, propoxy, isopropoxy, butoxy, isobutoxy, sec.butoxy and tert.butoxy, halogen, such as fluorine, chlorine and bromine, $C_2$-$C_4$alkanoylamino, such as acetylamino and propionylamino, benzoylamino or sulfo.

$R_3$ in formula (1) is in particular halogen, $C_1$-$C_4$alkyl, $C_2$-$C_6$alkanoylamino, $C_1$-$C_{10}$alkoxy or phenoxy.

Examples of a water-solubilizing group are in particular the sulfo, sulfato and thiosulfato groups. Preferably, the azo dyes of the formula (1) contain 1 to 2 groups of the formula —SO$_3$H, —OSO$_3$H or —SSO$_3$H, which are bound either to the diazo component and/or to the coupling component.

Azo dyes of the formula (1) in which Y is a sulfo or sulfato group are preferred.

Azo dyes of the formula (1) in which m is the number 1 are further preferred.

Azo dyes of the formula (1) in which n is the number 1 are also preferred. In particular the azo dyes of the formula (1) are substituted only by one sulfo or sulfato group as water-solubilizing group and only by one radical $R_3$.

Particular preference is given to azo dyes of the formula

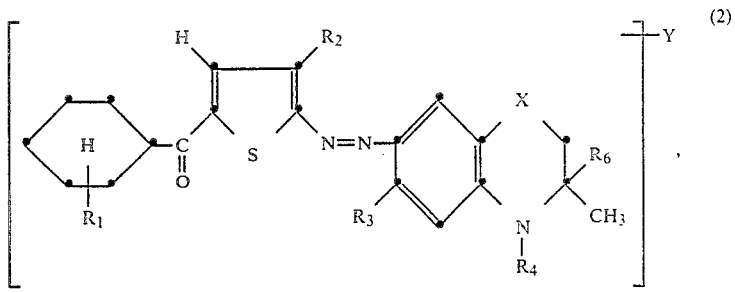

in which $R_1$, $R_2$, $R_3$, $R_4$, $R_6$ and X are as defined in formula (1) and Y is a sulfo or sulfato group.

Very particular preference is given to azo dyes of the formula (2) in which $R_1$ is hydrogen or $C_1$-$C_4$alkyl, $R_2$ is a group of the formula —CN, —COOR$_{11}$ or —CON(R$_8$)R$_9$, $R_3$ is hydrogen, $C_1$-$C_4$alkyl or $C_1$-$C_4$alkoxy, in particular $C_1$-$C_4$alkyl, $R_4$ is $C_1$-$C_4$alkyl, $C_1$-$C_4$alkoxy-$C_1$-$C_4$alkyl or benzyl, in particular $C_1$-$C_4$alkyl or $C_1$-$C_4$alkoxy-$C_1$-$C_4$alkyl, $R_6$ is hydrogen or $C_1$-$C_4$alkyl, X is an oxygen atom or a group of the formula —CH—R$_{14}$, $R_{11}$ is $C_1$-$C_4$ alkyl, $R_8$ is hydrogen, $R_9$ is $C_1$-$C_4$alkyl and $R_{14}$ is hydrogen or $C_1$-$C_4$alkyl, and Y is bound either to $R_9$ or $R_4$.

Of particular interest are azo dyes of the formula (2) in which $R_1$ is hydrogen, $R_2$ is —COOCH$_3$, —COOCH$_2$CH$_3$ or —CONHCH$_2$CH$_3$, $R_3$ is hydrogen, methyl or methoxy, $R_4$ is $C_2$-$C_4$alkyl, β-methoxyethyl, β-ethoxyethyl or benzyl, $R_6$ is hydrogen or methyl, X is an oxygen atom or —CHCH$_3$ and Y is a sulfo or sulfato group.

Azo dyes of the formula (2) which are of very particular interest conform to the formula

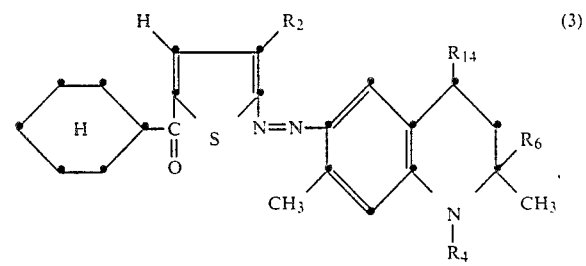

in which $R_2$ is —COOCH$_3$, $R_4$ is sulfoethyl or sulfatoethyl, $R_6$ is hydrogen or methyl and $R_{14}$ is hydrogen or methyl, or in which $R_2$ is —CONHCH$_2$CH$_2$OSO$_3$H, $R_4$ is ethyl, isopropyl, β-methoxyethyl or β-ethoxyethyl, $R_6$ is hydrogen or methyl and $R_{14}$ is methyl; or of the formula

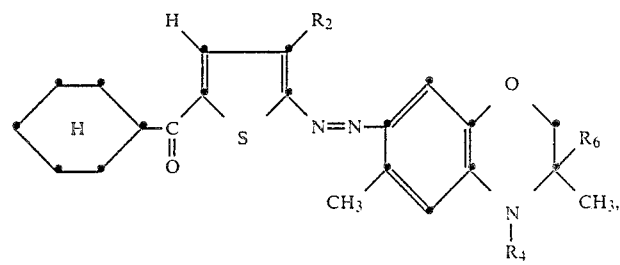

in which $R_2$ is —COOCH$_3$, $R_4$ is sulfoethyl or sulfatoethyl, $R_6$ is hydrogen or methyl, or in which $R_2$ is —CONHCH$_2$CH$_2$OSO$_3$H, $R_4$ is ethyl, isopropyl, β-methoxyethyl or β-ethoxyethyl and $R_6$ is hydrogen or methyl.

The invention further relates to a process for the preparation of the azo dyes of the formula (1), which comprises diazotizing an amine of the formula

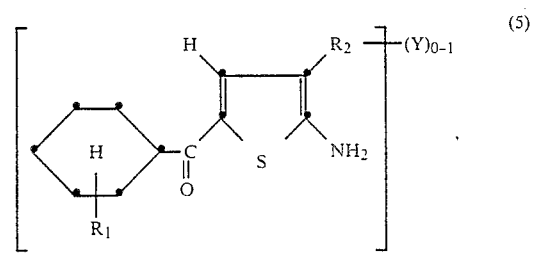

in which $R_1$ is as defined in formula (1) and $R_2$ is a group of the formula CN, —COR$_{10}$, —COOR$_{11}$ or —SO$_2$R$_{12}$, in which $R_{10}$, $R_{11}$ and $R_{12}$ are as defined in formula (1) and Y is a water-solubilizing group, and coupling the diazotized product onto a coupling component of the formula

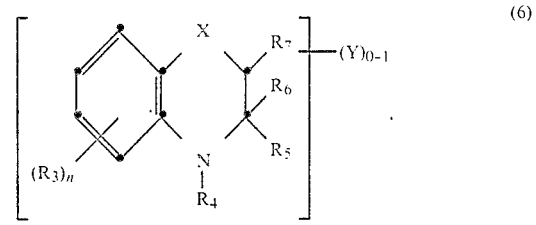

in which $R_3$, $R_4$, $R_5$, $R_6$, $R_7$, X, Y and n are as defined in formula (1), and, if desired, converting the radical —COOR$_{11}$ into a group of the formula —CON(R$_8$)R$_9$ or —CONHNHR$_{13}$ in which $R_8$, $R_9$ and $R_{13}$ are as defined in formula (1), and, if desired, subsequently introducing a watersolubilizing group into the radical $R_2$, so that the azo dye formed contains one or two water-solubilizing groups.

The diazotization of the diazo component of the formula (5) is usually carried out by the action of nitrous acid in aqueous/mineral acid solution at low temperature and the coupling onto the coupling component of the formula (6) is carried out at acid or neutral to alkaline pH values.

If desired, a free amino group can be converted after the coupling with an acylating or alkylating agent into an acylamino or alkylamino group and likewise a hydroxyl group can be converted by acylation or alkylation into an acyloxy or alkoxy group.

Furthermore, an aliphatic hydroxyl group can be converted into a water-solubilizing group, for example by sulfation into a sulfato group.

The introduction of the radicals $-CON(R_8)R_9$ or $-CONHNHR_{13}$ is usually carried out after the coupling reaction, for example by reacting the $-COOR_{11}$ radical with an amine or hydrazine derivative in an organic solvent, for example dimethylformamide at 40° to 80° C.

Analogously $R_2$ as $-COOR_{11}$ can, for example, be converted after the coupling reaction into a $-CONH(CH_2)_x-OH$ group, in which x is a number between 1 and 5, in particular the number 2 or 3. The hydroxyl group can then be converted into a sulfato group, for example with chlorosulfonic acid.

A preferred embodiment of the process according to the invention comprises using an amine of the formula (5) and/or a coupling component of the formula (6) in which Y is a sulfo or sulfato radical, the introduction of the sulfato group into the diazo component usually being carried out following the coupling reaction.

A further preferred embodiment of the process according to the invention comprises using an amine of the formula (5) and a coupling component of the formula (6) which together contain only one sulfo or sulfato group, or, if the coupling component of the formula (6) is free from water-solubilizing groups, introducing a sulfato group into the diazo component following the coupling.

A likewise preferred embodiment of the process according to the invention comprises using a coupling component of the formula (6) in which n is the number 1.

A particularly preferred embodiment of the process according to the invention for the preparation of the azo dyes of the formula (2) comprises diazotizing an amine of the formula (5) and coupling the diazotized product onto a coupling component of the formula

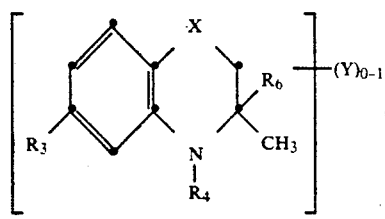

(7)

in which $R_3$, $R_4$, $R_5$, X and Y are as defined in formula (2), and, if desired, subsequently introducing the radical $-CON(R_8)R_9$ or $-CONHNHR_{13}$ and also, if desired, a sulfo or sulfato group, so that the azo dye formed contains only a single sulfo or sulfato group.

A very particularly preferred embodiment of the process according to the invention comprises diazotizing an amine of the formula (5) in which $R_1$ is hydrogen or $C_1-C_4$alkyl and $R_2$ is a group of the formula $-CN$ or $COOR_{11}$ in which $R_{11}$ is $C_1-C_4$alkyl and coupling the diazotized product onto a coupling component of the formula (7) in which $R_3$ is hydrogen, $C_1-C_4$alkyl or $C_1-C_4$alkoxy, in particular $C_1-C_4$alkyl, $R_4$ is $C_1-C_4$alkyl, $C_1-C_4$alkoxy-$C_1-C_4$alkyl or benzyl, in particular $C_1-C_4$alkyl or $C_1-C_4$alkoxy-$C_1-C_4$-alkyl, $R_6$ is hydrogen or $C_1-C_4$alkyl, X is an oxygen atom or the group $-CH-R_{14}$, in which $R_{14}$ is hydrogen or $C_1-C_4$alkyl, and Y is a sulfo or sulfato group, and, if desired, subsequently introducing the radical $-CON(R_8)R_9$, in which $R_8$ is hydrogen and $R_9$ is $C_1-C_4$alkyl or $C_1-C_4$alkoxy, and, if desired, if $R_9$ is $C_1-C_4$alkoxy, introducing a sulfato group into $R_9$, so that the azo dye formed contains only a single sulfo or sulfato group on $R_9$ or $R_4$.

The azo dyes of the formula (2), which are of particular interest, are obtained by diazotizing an amine of the formula (5) in which $R_1$ is hydrogen and $R_2$ is a group of the formula $-COOCH_3$ or $-COOC_2H_5$ and coupling the diazotized product onto a coupling component of the formula (7) in which $R_3$ is hydrogen, methyl or methoxy, $R_4$ is $C_2C_4$alkyl, $\beta$-methoxyethyl, $\beta$-ethoxyethyl or benzyl, $R_6$ is hydrogen or methyl, X is an oxygen atom or

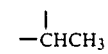

and Y is a sulfo or sulfato group, and, if desired, subsequently introducing the radical $-CONHCH_2CH_3$ and, if desired, converting the radical $-CONHCH_2CH_3$ into the radical $-CONHCH_2CH_2OH$ and introducing into this radical a sulfato group, so that the azo dye formed contains only a single sulfo or sulfato group on $R_2$ or $R_4$.

The azo dyestuffs of the formula (3) which are of very particular interest are obtained by diazotizing an amine of the formula

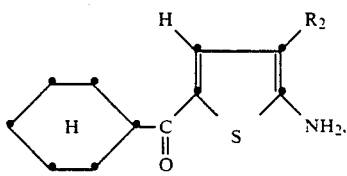

(8)

in which $R_2$ is $-COOCH_3$ and coupling the diazotized product onto a coupling component of the formula

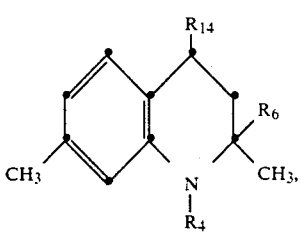

(9)

in which $R_4$ is $\beta$-sulfoethyl or $\beta$-sulfatoethyl, $R_6$ is hydrogen or methyl and $R_{14}$ is hydrogen or methyl; or by diazotizing an amine of the formula (8) and coupling the diazotized product onto a coupling component of the formula (9) in which $R_4$ is ethyl, isopropyl, $\beta$-methoxyethyl or $\beta$-ethoxyethyl, $R_6$ is hydrogen or methyl and $R_{14}$ is methyl, and subsequently converting the —COOCH₃ radical into a —CONHCH₂CH₂OSO₃H group.

The azo dyes of the formula (4) which are of very particular interest are prepared by diazotizing an amine of the formula (8) and coupling the diazotized product onto a coupling component of the formula

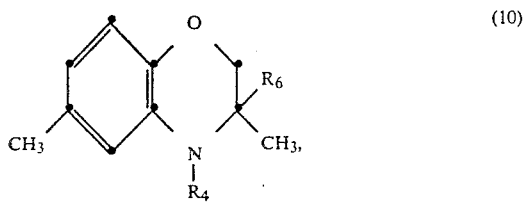

in which $R_4$ is β-sulfoethyl or β-sulfatoethyl and $R_6$ is hydrogen or methyl; or by diazotizing an amine of the formula (8) and coupling the diazotized product onto a coupling component of the formula (10) in which $R_4$ is ethyl, isopropyl, β-methoxyethyl or β-ethoxyethyl, and $R_6$ is hydrogen or methyl and then subsequently converting the —COOCH₃ group into the —CONHCH₂CH₂OSO₃H group.

Of the large number of possible coupling components of the formula (6), examples are:

N-ethyl-1,2,3,4-tetrahydro-2,2,4,7-tetramethylquinoline,

N-isopropyl-1,2,3,4-tetrahydro-2,2,4,7-tetramethylquinoline,
N-ethyl-3,6-dimethyl-2H-1,4-benzoxazine,
N-β-sulfatoethyl-3,6-dimethyl-2H-1,4-benzoxazine,
N-β-sulfoethyl-3,6-dimethyl-2H-1,4-benzoxazine,
N-β-sulfatoethyl-1,2,3,4-tetrahydro-2,2,4,7-tetramethylquinoline,
N-β-sulfoethyl-1,2,3,4-tetrahydro-2,2,4,7-tetramethylquinoline,
N-β-methoxyethyl-1,2,3,4-tetrahydro-2,2,4,7-tetramethylquinoline,
N-β-ethoxyethyl-1,2,3,4-tetrahydro-2,2,4,7-tetramethylquinoline,
N-β-methoxyethyl-3,6-dimethyl-2H-benzoxazine,
N-β-ethoxyethyl-3,6-dimethyl-2H-1,4-benzoxazine.

The coupling components of the formula (6) are known per se or can be prepared analogously to known compounds.

The amines of the formula (5) can be prepared, for example analogously to known processes, for example by condensing a compound of the formula

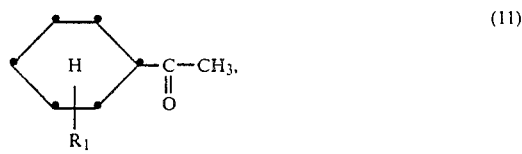

in which $R_1$ is as defined in formula (1) in the presence of a base, for example sodium methylate, with a formic ester, for example methyl formate, and subsequently reacting the condensation product with sulfur powder and a compound of the formula

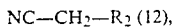

in which $R_2$ is as defined in formula (5).

The condensation of the compound of the formula (11) with a formic ester and also the reaction with sulfur powder and a compound of the formula (12) is usually carried out in an organic solvent, for example dimethylformamide, at temperatures between 10° and 65° C.

A further possibility of preparing amines of the formula (5) comprises condensing a compound of the formula (11) in the presence of a base, for example potassium tert.butylate, in an organic solvent, for example dimethylformamide, with a compound of the formula

in which $R_{15}$ is an alkyl-substituted amino group, for example —N(CH₂CH₃)₂ or a piperidine radical, or is an alkoxy group, for example methoxy, and $R_2$ is —COOR₁₁ or —CN and $R_{11}$ *is as defined in formula* (1), to give a compound of the formula (14), which can be present in one of the two isomeric forms shown

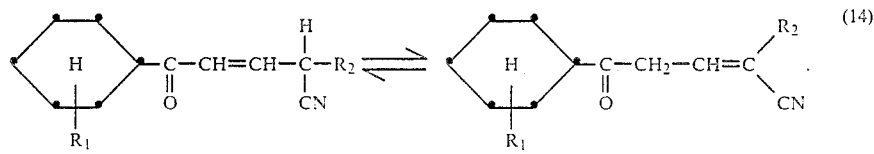

The condensation product of the formula (14) is then reacted with sulfur powder in an alcohol, for example ethanol or isopropanol, in the presence of piperidine or diethylamine at a temperature between 45° and 100° C. to give a compound of the formula (5).

The condensation of the compound of the formula (11) with a compound of the formula (13) takes place at 50° to 65° C.

The dyes of the formula (1) which contain at least one water-solubilizing group are present either in the form of their free acid or preferably as salts thereof.

Examples of suitable salts are the alkali metal, alkaline earth metal or ammonium salts or the salts of an organic amine. Examples are the sodium salts, lithium salts, potassium salts or ammonium salts or the salt of triethanolamine.

The azo dyes according to the invention of the formula (1) are suitable for dyeing and printing nitrogen-containing or hydroxyl-containing fibre materials, for example textile fibre materials made of cellulose, silk and in particular wool and synthetic polyamides. Level dyeings in blue hues having good general fastness properties, in particular good rub, wet, wet rub and light fastness properties. Furthermore, the dyes according to the invention are highly compatible with other acid dyes. The abovementioned textile material can be present in various forms of processing, for example as fibre, yarn, woven or knitted fabric. The dyes of the formula (1) are in particular suitable for dyeing and printing natural or synthetic polyamide fibre materials.

In the examples which follow, parts are by weight. Temperatures are in degrees Celsius. Parts by weight relate to parts by volume as the gram relates to the cubic centimetre.

EXAMPLE 1

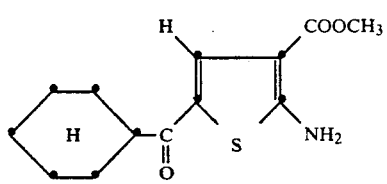 (101)

(a)

50.6 parts of sodium methylate (97% pure) are stirred at about 10° into 240 parts of dimethylformamide. A mixture of 60.6 parts of methyl formate and 119.6 parts of cyclohexyl methyl ketone (95% pure) is then added dropwise over a period of 2 hours at such a rate that the inside temperature constantly stays between 10° and 12° . After the entire mixture has been added, stirring at 20° is continued for 1½ hours. Over a period of about 2 minutes, 37.6 parts of dimethylamine hydrochloride are then added, and stirring at 28° to 32° is continued for 1 hour. 14.4 parts of sulfur powder and, 10 minutes later, 45 parts of methyl cyanoacetate are then added, and the mixture is stirred at 60° for 2 hours. It is then cooled to about 5°, and 1000 parts of water are added dropwise at a constant rate over a period of 1 hour. The product which precipitates is filtered off with suction and thoroughly washed with about 500 parts of water. The solid substance which is still slightly moist is then added to 200 parts of a solution consisting of CHCl₃ and petroleum ether (40° to 60°) in a ratio of 1:4, and the mixture is stirred for a short time. The product is then filtered off with suction and washed with petroleum ether (40° to 60°). This gives 43 parts of a compound of the formula (101).

The procedure as described above is repeated, except (b)

that instead of 45 parts of methyl cyanoacetate the equimolar amount of ethyl cyanoacetate is used to give the compound of the formula

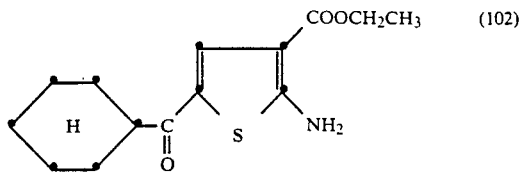

EXAMPLE 2

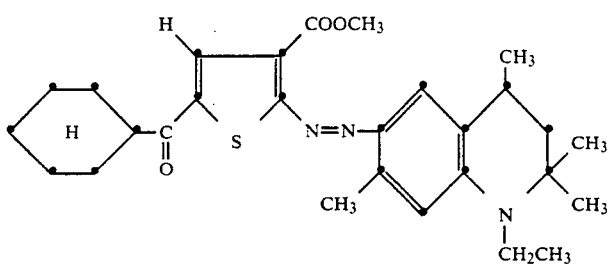

4.2 parts of 2-amino-3-carbomethoxy-5-cyclohexanecarbonylthiophene (97% pure) are added at about 10° with thorough stirring to a solution consisting of 37.5 parts of glacial acetic acid and 18 parts of concentrated hydrochloric acid (32% pure). The mixture is then cooled to 0° and diazotized at about 3° with a solution consisting of 1.1 parts of NaNO₂ in 6 parts of water. After the addition of nitrite is completed, the mixture is stirred at 0° for another 15 minutes, then 1.5 parts of sulfamic acid are added, and the mixture is again stirred for 2 minutes. 3.5 parts of N-ethyl-1,2,3,4-tetrahydro-2,2,4,7-tetramethylquinoline (93% pure) are then added dropwise at 0° over a period of 2 minutes. 16 parts of sodium acetate are then added at 0° to 2° in four equal portions over a period of 30 minutes, and the mixture is again stirred for 30 minutes. A solution consisting of 9 parts of sodium acetate, 4.5 parts of sodium carbonate and 35 parts of water are then continuously added dropwise at 0°–5° over a period of about 35 minutes; without any further cooling, the reaction mixture is then stirred until it reaches room temperature, 150 parts of water are added over a period of about 15 minutes, and the dye which precipitates is filtered off. The product is washed with 100 parts of warm water and dried at 60° in a vacuum drying cabinet. This gives 6.4 parts of the compound of the formula (103) as a blue-black powder.

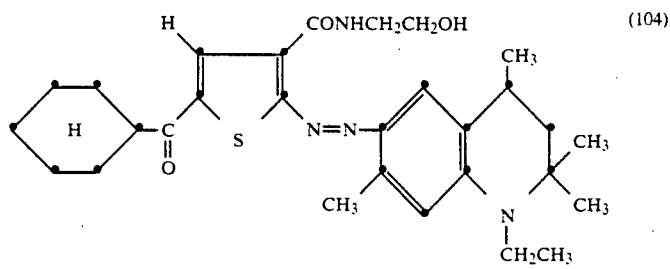

5 parts of the dye prepared according to the above procedure are added with thorough stirring at about 50° to 6.2 parts of ethanolamine and 11.4 parts of dimethylformamide. The mixture is stirred at about 70 to 75° for 4 hours, then cooled to 10°, and 90 parts of a 5% aqueous Na₂SO₄ solution are added dropwise over a period of 30 minutes. The product is filtered off with suction, washed with 250 parts of hot water, and dried at 60° in a vacuum drying cabinet. This gives 4.3 parts of the compound of the formula (104) as a black powder.

(c)
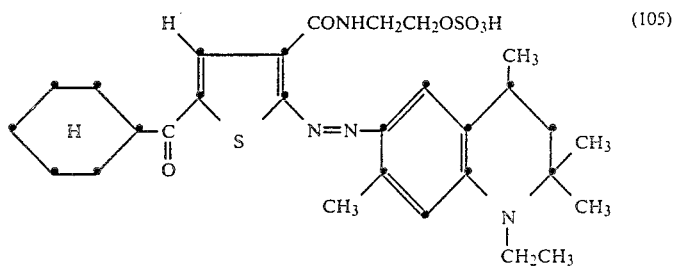
(105)

4 parts of the dye of the formula (104) are added with thorough stirring at 40° to 16 parts of dimethylformamide. 1.92 parts of chlorosulfonic acid (97% pure) are then added dropwise at such a rate that the inside temperature does not exceed 40°. The mixture is stirred at 40° to 45° for 3 hours, then cooled to about 10°, and 90 parts of toluene are then added dropwise over a period of 30 minutes. The product is filtered off with suction while cold and washed with toluene. Drying in a vacuum drying cabinet at 60° gives 4.5 parts of the compound of the formula (105) as a black powder. The dye obtained, which, in the form of the free acid, conforms to the formula (105), dyes polyamide in blue hues.

The procedure as described above is repeated, except that instead of 3.5 parts of N-ethyl-1,2,3,4-tetrahydro-2,2,4,7-tetramethylquinoline an equimolar amount of one of the coupling components of the formula

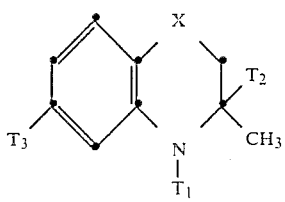

which are listed in the table which follows and in which X, $T_1$, $T_2$ and $T_3$ are as defined in columns 2, 3, 4 and 5 of Table 1 which follows, is used to give the azo dyes listed in column 6 of Table 1 in the form of the free acids, which dye synthetic polyamide in the hues listed in column 7.

TABLE 1

| Example | X | $T_1$ | $T_2$ | $T_3$ | Dye | Hue on polyamide |
|---|---|---|---|---|---|---|
| 3 | $-\overset{\|}{C}HCH_3$ | $-CH(CH_3)_2$ | $-CH_3$ | $-CH_3$ | (106) | blue |
| 4 | $-O-$ | $-CH_2CH_3$ | $-H$ | $-CH_3$ | (107) | blue |
| 5 | $-\overset{\|}{C}HCH_3$ | $\begin{array}{c}-CH_2-CH_2\\ H_3C-CH_2-O\end{array}$ | $-CH_3$ | $-CH_3$ | (108) | blue |

TABLE 1-continued

| Example | X | $T_1$ | $T_2$ | $T_3$ | Dye | Hue on polyamide |
|---------|---|-------|-------|-------|-----|------------------|
| 6 | $-CHCH_3$ | $-CH_2-CH_2-$<br>$H_3C-O$ | $-CH_3$ | $-CH_3$ | (109) Phenyl-C(=O)-C(S)=C(H)-C(CONHCH_2CH_2OSO_3H)=N-N=C(CH_3)-C_6H_2(CH_3)-N(CH_2C(CH_3)_2CH_3)(CH_2CH_2-O-CH_3) | blue |
| 7 | $-O-$ | $-CH_2-CH_2-$<br>$H_3C-O$ | $-H$ | $-CH_3$ | (110) Phenyl-C(=O)-C(S)=C(H)-C(CONHCH_2CH_2OSO_3H)=N-N=C(CH_3)-C_6H_2(CH_3)-O-CH(CH_3)_2; N(CH_3)(CH_2CH_2-O-CH_3) | blue |
| 8 | $-O-$ | $-CH_2-O-CH_2-$ | $-H$ | $-CH_3$ | (111) Phenyl-C(=O)-C(S)=C(H)-C(CONHCH_2CH_2OSO_3H)=N-N=C(CH_3)-C_6H_2(CH_3)-O-CH(CH_3)_2; N(CH_3)(CH_2CH_2-O-CH_2CH_3) | blue |
| 9 | $-CHCH_3$ | $-CH_2CH_2CH_3$ | $-CH_3$ | $-CH_3$ | (112) Phenyl-C(=O)-C(S)=C(H)-C(CONHCH_2CH_2OSO_3H)=N-N=C(CH_3)-C_6H_2(H_3C)-N(CH_2C(CH_3)_2CH_3)(CH_2CH_2CH_3) | blue |

TABLE 1-continued

| Example | X | $T_1$ | $T_2$ | $T_3$ | Dye | Hue on polyamide |
|---|---|---|---|---|---|---|
| 10 | $-\overset{\displaystyle |}{C}HCH_3$ | $-CH(CH_3)_2$ | $-CH_3$ | $-CH_3$ | (113) | blue |
| 11 | $-\overset{\displaystyle |}{C}HCH_3$ | $-CH_2CH_2CH_3$ | $-CH_3$ | $-CH_3$ | (114) | blue |
| 12 | $-O-$ | $-CH_2CH_2CH_3$ | $-CH_3$ | $-H$ | (115) | reddish blue |
| 13 | $-O-$ | $-CH(CH_3)_2$ | $-CH_3$ | $-H$ | (116) | reddish blue |

TABLE 1-continued

| Example | X | $T_1$ | $T_2$ | $T_3$ | Dye | Hue on polyamide |
|---|---|---|---|---|---|---|
| 14 | —O— | —CH$_2$CH$_2$CH$_2$CH$_3$ | —CH$_3$ | —H | (117) | reddish blue |
| 15 | —CHCH$_3$ | —CH$_2$CH$_2$CH$_3$ | —CH$_3$ | —H | (118) | reddish blue |
| 16 | —CHCH$_3$ | —CH$_2$CH$_3$ | —CH$_3$ | —H | (119) | reddish blue |

TABLE 1-continued
| Example | X | T₁ | T₂ | T₃ | Dye | Hue on polyamide |
|---|---|---|---|---|---|---|
| 17 | —CHCH₃ | —CH₂—⌬ | —CH₃ | —CH₃ | (120) | violet |
| 18 | —O— | —CH₂—⌬ | —H | —CH₃ | (121) | violet |
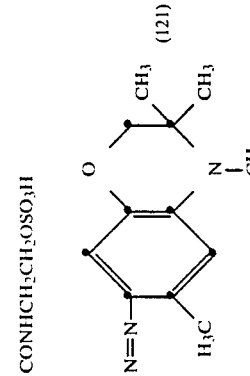

EXAMPLE 19

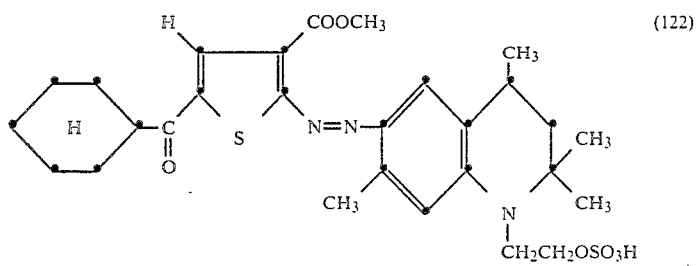
(122)

2.84 parts of 2-amino-3-carbomethoxy-5-cyclohexanecarbonylthiophene are added with thorough stirring at about 5° to a solution consisting of 15 parts of 60% acetic acid and 2.5 parts of 98% sulfuric acid. The mixture is then cooled to 0° and diazotized with 3.6 parts of nitrosyl sulfulric acid (40% pure) at a maximum inside temperature of 2° . Stirring is continued at 0° for 90 minutes, excess nitrite is destroyed by the addition of 1 part of sulfamic acid, and the deep-red diazonium salt solution is added dropwise to a heterogeneous solution containing 3.6 parts of the potassium salt of N-β-sulfatoethyl-1,2,3,4-tetrahydro-2,2,4,7-tetramethylquinoline. During this addition, the inside temperature should not exceed +4°. Stirring is continued for 90 minutes, and 8 parts of a 50% aqueous sodium hydroxide solution are then added at such a rate that the inside temperature remains between 0 and +5°. b 18 parts of water are then added dropwise over a period of 30 minutes, the mixture is subsequently warmed to 40°, the dye which precipitates is filtered off and washed with 100 parts of a 10% aqueous NaCl solution It is dried at 50° in a vacuum drying cabinet. This gives 4.3 parts of dye, which, in the form of the free acid, conforms to the formula (122) and dyes polyamide in reddish blue hues.

EXAMPLES 20 to 23

The procedure as described above is repeated, except that instead of 3.6 parts of N-β-sulfatoethyl-1,2,3,4-tetrahydro-2,2,4,7-tetramethylquinoline an equimolar amount of one of the coupling components listed in column 2 of Table 2 and, where indicated, instead of 2.84 parts of 2-amino-3-carbomethoxy-5-cyclohexanecarbonylthiophene an equimolar amount of 2-amino-3-carboethoxy-5-cyclohexanecarbonylthiophene are used to give the azo dyes listed in the form of the free acids in column 3 of Table 2, which dye synthetic polyamide in the hues listed in column 4.

TABLE 2

| Ex. | Coupling component | Dye | Hue on polyamide |
|---|---|---|---|
| 20 | [structure] | [structure] (123) | reddish blue |
| 21 | [structure] | [structure] (124) | reddish blue |

TABLE 2-continued

| Ex. | Coupling component | Dye | Hue on polyamide |
|---|---|---|---|
| 22 | 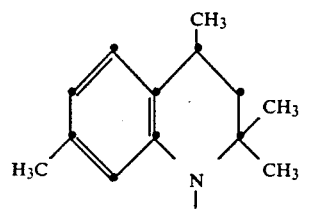 | 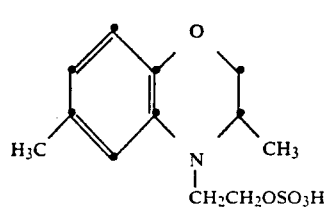(125) | reddish blue |
| 23 | 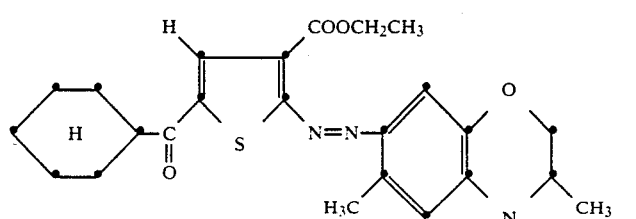 | (126) | reddish blue |

EXAMPLE 24

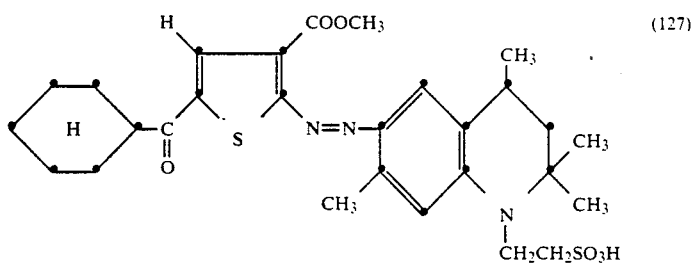

2.8 parts of 2-amino-3-carbomethoxy-5-cyclohexanecarbonylthiophene are added with stirring at about 5° to a solution consisting of 15 parts of 60% acetic acid and 2 parts of concentrated sulfuric acid (98% pure). The mixture is then diazotized at 0° to 2° with 3.5 parts of nitrosyl sulfuric acid (40% pure). Stirring at 0° to 2° is continued for 90 minutes, 1 part of sulfamic acid is then added, and the deep-red diazonium salt solution is added dropwise to a heterogenous solution consisting of 15 parts of 15% aqueous sulfuric acid and 3.25 parts of the sodium salt of N-β-sulfo-ethyl-1,2,3,4-tetrahydro-2,2,4,7-tetramethylquinoline. During this addition, the inside temperature should be between 0° and +3°. Stirring at 0° is continued for 2 hours, and 8.5 parts of a 50% aqueous sodium hydroxide solution are then added over a period of about 15 minutes at such a rate that the inside temperature does not exceed +5°. After a further 15 minutes, 25 parts of water are added dropwise, the mixture is heated to 40° to 45°, allowed to cool slightly, and the dye is filtered off with suction. Drying at 60° in a vacuum drying cabinet gives 5.2 parts of the dye, which, in the form of the free acid, conforms to the formula (127) and dyes polyamide in reddish blue hues.

EXAMPLES 25 to 30

The procedure as described above is repeated, except that instead of 3.25 parts of N-β-sulfoethyl-1,2,3,4-tetrahydro-2,2,4,7tetramethylquinoline an equimolar amount of one of the coupling components listed in column 2 of Table 3 and, where indicated, instead of 2.8 parts of 2-amino-3-carbomethoxy-5-cyclohexanecarbonylthiophene an equimolar amount of 2-amino-3-carboethoxy-5-cyclohexanecarbonylthiophene are used to give the azo dyes listed in the form of the free acids in column 3 of Table 3, which dye synthetic polyamide in the hues listed in column 4.

TABLE 3

| Ex. | Coupling component | Dye | Hue on polyamide |
|---|---|---|---|
| 25 | (structure) | (128) | reddish blue |
| 26 | (structure) | (129) | reddish blue |
| 27 | (structure) | (130) | reddish blue |
| 28 | (structure) | (131) | reddish blue |
| 29 | (structure) | (132) | violet |

TABLE 3-continued

| Ex. | Coupling component | Dye | Hue on polyamide |
|---|---|---|---|
| 30 | 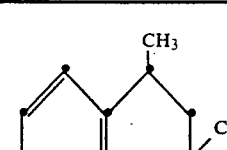 | 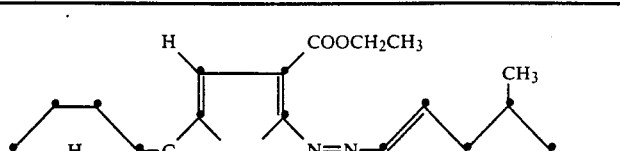 (133) | violet |

Dyeing Procedure I 10 parts of a nylon-6,6 knitted fabric (Helanca) are dyed in 500 parts of an aqueous liquor containing 2 g/l of ammonium acetate and adjusted to a pH of 5 with acetic acid. The content of the dye of the formula (105) according to Example 2 is 0.3%, relative to the weight of the fibre. The duration of the dyeing at a temperature of 98° is 30 to 90 minutes. The dyed nylon-6,6 knitted fabric is then removed and washed and dried as usual.

This gives a blue-coloured nylon-6,6 knitted fabric having a pure shade and good overall fastness properties.

Dyeing Procedure II 10 parts of a nylon-6,6 knitted fabric are dyed in 500 parts of an aqueous liquor containing 1 g/l of monosodium phosphate and adjusted to a pH of 6 with disodium phosphate. The content of the dye of the formula (106) according to Example 3 is 0.4%, relative to the weight of the fibre. The duration of the dyeing at a temperature of 98° is 30 to 90 minutes. The dyed nylon-6,6 knitted fabric is then removed and washed and dried as usual.

This gives a blue-coloured nylon-6,6 knitted fabric having a pure shade and good overall fastness properties.

Dyeing Procedure III 10 parts of a woollen fabric are dyed in 500 parts of an aqueous liquor. The contents of dye of the formula (122) according to Example 19 is 0.8%, that of anhydrous sodium sulfate 5% and that of 80% acetic acid 2%. The duration of the dyeing at a temperature of 98° is 30–60 minutes. The reddish blue-coloured woollen fabric washed and dried as usual has very good general fastness properties.

What is claimed is:

1. An azo dye of the formula

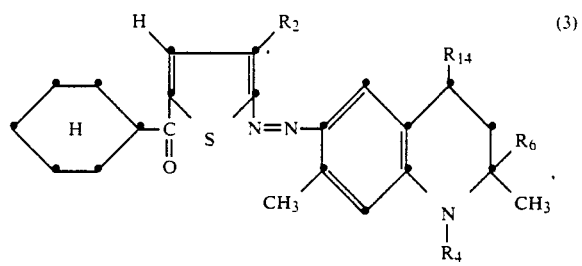 (3)

in which when $R_2$ is —COOCH$_3$, then $R_4$ is sulfoethyl, $R_6$ is hydrogen or methyl and $R_{14}$ is methyl, or in which when $R_2$ is —CONHCH$_2$CH$_2$OSO$_3$H, then $R_4$ is ethyl, isopropyl, β-methoxyethyl or β-ethyoxyethyl, $R_6$ is hydrogen or methyl or $R_{14}$ is methyl.

2. An azo dye of claim 1 in which when $R_2$ is —COOCH$_3$, then $R_4$ is sulfoethyl, $R_6$ is methyl and $R_{14}$ is methyl, or in which when $R_2$ is CONGHCH$_2$OSO$_3$H, then $R_4$ is ethyl, $R_6$ is methyl and $R_{14}$ is methyl.

* * * * *